(12) United States Patent
Brauer et al.

(10) Patent No.: US 8,024,892 B2
(45) Date of Patent: Sep. 27, 2011

(54) DRUM HOUSING

(75) Inventors: Hans-Georg Brauer, Kaufungen (DE); Carsten Huege, Wehretal (DE); Enrico Schliwa, Lauchroeden (DE); Harald Koellner, Altenstadt (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 772 days.

(21) Appl. No.: 10/594,849

(22) PCT Filed: Mar. 24, 2005

(86) PCT No.: PCT/EP2005/003194
§ 371 (c)(1),
(2), (4) Date: Apr. 2, 2007

(87) PCT Pub. No.: WO2005/098188
PCT Pub. Date: Oct. 20, 2005

(65) Prior Publication Data
US 2008/0263959 A1    Oct. 30, 2008

(30) Foreign Application Priority Data
Apr. 6, 2004    (DE) .......................... 10 2004 017 322

(51) Int. Cl.
*E05F 15/00*    (2006.01)
(52) U.S. Cl. .................. 49/139; 49/352; 49/348
(58) Field of Classification Search .............. 49/139, 49/140, 348, 349, 352, 353, 502
See application file for complete search history.

(56) References Cited

U.S. PATENT DOCUMENTS

| | | | | |
|---|---|---|---|---|
| 2,621,544 A * | 12/1952 | Rossmann | ....................... | 475/4 |
| 4,085,629 A * | 4/1978 | Fogarollo | ........................ | 74/625 |
| 4,421,299 A * | 12/1983 | Hess | ............................. | 254/342 |
| 4,503,732 A * | 3/1985 | Schust | ............................ | 74/625 |
| 4,794,735 A | 1/1989 | Batchelder et al. | | |
| 5,207,393 A * | 5/1993 | Marscholl | .................. | 242/396.5 |
| 5,773,947 A * | 6/1998 | Torii et al. | ..................... | 318/466 |
| 6,094,868 A * | 8/2000 | Otaka et al. | ..................... | 49/349 |
| 6,135,778 A | 10/2000 | Ubelein | | |
| 6,185,873 B1 * | 2/2001 | Saito | ............................. | 49/502 |
| 6,253,491 B1 * | 7/2001 | Pages | ............................ | 49/352 |
| 6,305,129 B1 * | 10/2001 | Eckhardt et al. | ............... | 49/502 |

(Continued)

FOREIGN PATENT DOCUMENTS
DE    3239370    9/1983
(Continued)

OTHER PUBLICATIONS

International Search Report and Written Opinion, Hans-Georg Brauer et al., dated Oct. 20, 2005.

(Continued)

*Primary Examiner* — Jerry Redman
(74) *Attorney, Agent, or Firm* — Matthew B. Dernier, Esq.; Gibson & Dernier LLP

(57) ABSTRACT

The invention relates to a drum housing, a hybrid door for a motor vehicle with a door module with a mounting area for mounting a cable drum of a either a power or manual window lift drive, whereby the mounting area exhibits a first area with a first diameter that is sufficient for mounting the cable drum for the power window lift, and a second area with a second diameter that is sufficient for mounting the cable drum for the manual window lift.

15 Claims, 2 Drawing Sheets

U.S. PATENT DOCUMENTS

| | | | |
|---|---|---|---|
| 6,408,572 B1 * | 6/2002 | Uchimura et al. | 49/352 |
| 6,427,386 B1 | 8/2002 | Kalb et al. | |
| 6,560,928 B2 * | 5/2003 | Cabanne et al. | 49/349 |
| 6,574,922 B2 * | 6/2003 | Velthaus et al. | 49/352 |
| 6,655,089 B2 * | 12/2003 | Le Gallo | 49/352 |
| 6,758,012 B2 * | 7/2004 | Shimizu | 49/349 |
| 6,892,495 B2 * | 5/2005 | Burdach | 49/348 |
| 7,038,338 B2 * | 5/2006 | Sesselmann et al. | 310/83 |
| 7,044,412 B2 * | 5/2006 | Hemond et al. | 242/390.8 |
| 7,059,085 B1 * | 6/2006 | Chu | 49/352 |
| 7,100,326 B2 * | 9/2006 | Shimada et al. | 49/360 |
| 2002/0007596 A1 | 1/2002 | Cabanne et al. | |

FOREIGN PATENT DOCUMENTS

| | | |
|---|---|---|
| DE | 8415624.4 | 5/1984 |
| DE | 4139043 | 11/1991 |
| DE | 69431361 | 11/1993 |
| DE | 4420692 | 6/1994 |
| DE | 19706872 | 2/1997 |
| DE | 69517943 | 3/2001 |
| EP | 0579535 | 1/1994 |
| EP | 0653538 | 5/1995 |
| EP | 0724060 | 7/1996 |
| EP | 0860572 | 11/1997 |
| EP | 0944497 | 12/1997 |
| EP | 0961703 | 2/1998 |
| GB | 2108912 | 5/1983 |
| WO | PCT/EP2005/003194 | 11/2006 |

OTHER PUBLICATIONS

Plastverarbeiter 52. Jahrg. (2001) Nr. 9, 3 pages, http://dbindustrie.svhfi.securitas.net/AI/resources/2b53f848ad7.pdf.

Bayer Material Science—web pages, pp. 1-8 (1999-2004).

* cited by examiner

DRUM HOUSING

BACKGROUND

The present invention relates to a drum housing for a motor vehicle, as well as a door module and a hybrid door.

German patent DE 3239370C2 describes a motor vehicle door with an outside door panel exhibiting a supporting frame with an opening for a window pane. A unit carrier holds door fittings, such as a window pane, a window lift mechanism, and a door lock, and is manufactured separately from the outside door panel, ready-assembled and installed on the outside door panel. Inside door lining forms the completion of the motor vehicle door facing the vehicle interior and is connected with the unit carrier or the outer door panel.

U.S. Pat. No. 4,794,735 describes a modular motor vehicle door consisting of an outer door skin, a door module with a door frame, and side-impact protection, and inside lining. A drive unit and a door lock mechanism for a window lift is mounted on the side impact protection.

European patent EP-A-579535 describes a base plate upon which a door handle is placed from the side of the dry area, interior lining and a switch for a window lift unit attached to the side of the wet area is arranged. The window lift unit, together with the motor drive unit, is arranged on the dry area side of the base plate, which is screwed on to the inside door panel of the door body, so that the vehicle door is split in a wet area situated outside and a dry area situated inside. How to split a vehicle door in a wet area and a dry area is also described in European patents EP-A-0944497 und EP-A-0961703B1.

German patent DE69421361T2 furthermore describes a cable window lift with a simplified, kinematic chain. The cable drum of the cable window lift consists of two parts that are coaxial to one another, and placed upon one another by the projections and an edge of the housing, so that both parts are rotable over one another. Moreover, a circular toothed rack is provided in the housing. The projections engage with the toothed rack and fasten one housing part with respect to the other in one direction, and/or release it in the opposite direction.

German patent DE 84 15 624 U1 furthermore describes a vehicle door with a window lift, in which instead of a lever arm drive, a cable or Bowden wire drive or a threaded cable drive may be realized, whereby the respective power transmission member extends from the motor drive of a base plate.

Moreover, German patent DE 695 17 943 T2 describes a window lift for a motor vehicle window that comprise drive means acting upon a locked kinematic hoist in order to move the side window of the vehicle, whereby the said drive means are manual and electrical.

Further drive mechanisms that are suitable for window lifts are known from German patents DE19706872A1, DE4139043A1 and DE4420692C2.

A general disadvantage of previously known door modules is that for series production of motor vehicles, two variants of the door module need to be produced, i.e., one variant for motor vehicles equipped with a power window lift, and another variant for vehicles equipped with a manual window lift. This is, among other things, due to the fact, that the cable drums for the power and manual window lifts are of different size.

SUMMARY OF THE INVENTION

The invention is based on the problem of providing an improved drum housing that is suitable for power and manual window lifts.

According to the invention, the drum housing is designed in order to hold a cable drum for either a power or manual window lift. For this purpose, the mounting area of the drum housing is shaped in such a way that it exhibits a first area with a large diameter and a second area with a second diameter, whereby both partial areas of the mounting area are arranged concentrically along the rotational axis of the cable drum.

According to a preferred embodiment of the invention, the carrier part of a door module intended for mounting the door fittings and door units has a mounting area for the cable drum for either a power or manual window lift. For this purpose, the mounting area is shaped such that it exhibits a first area with a large diameter and a second area with a second diameter, whereby both partial areas of the mounting area are arranged concentrically along the rotational axis of the cable drum.

The first area has a relatively large diameter, which is needed for holding the cable drum of the power window lift. A cable drum for a manual window lift extends against it through both partial areas.

According to a preferred embodiment of the invention, the area with the greater diameter seen from the interior of the vehicle is arranged before the second area with the smaller diameter. This is especially advantageous, when the carrier part serves to divide the door into a wet and a dry area. In this case, the first area is arranged such that it faces the interior of the vehicle, i.e., the dry area, and the second area faces the wet area.

According to a preferred embodiment of the invention, the area for mounting the cable drum has a cable drum housing forming a structural unit with the carrier part. This is especially advantageous, when concerned with a synthetic injection molded part for the carrier part. In this case, the carrier part may be manufactured together with the cable housing in one processing step, thus eliminating the installation of a separate cable drum housing. A further advantage is that a separate seal toward the dry area is then no longer needed, since the cable drum housing forms a structural unit with the carrier part. For this reason, penetration of humidity from the wet area into the dry area in the area of the cable drum housing may be safely prevented.

According to a further preferred embodiment of the invention, the carrier part has fastening elements for both a power window drive motor and a brake housing of the manual window drive. Thus, the same door model may be used both for vehicles being equipped with a power window drive and vehicles being equipped with a manual window drive, including when the motor of the power window drive and the brake housing of the manual window lift have different attachment points at the carrier part of the door module.

According to a further preferred embodiment of the invention, the mounting area has a thrust bearing for the cable drum of the manual window lift. This thrust bearing is preferably designed as a slide bearing. It may also serve to center the crank axle for the manual or power window lift.

According to a further preferred embodiment of the invention, the first area for mounting the cable drum for the power window lift has a diameter of between about 35 and 65 mm, preferably between about 40 and 60 mm, while the diameter of the second area is considerably less, i.e., between about 20 and 40 mm, preferably between about 25 and 35 mm.

According to a further preferable embodiment of the invention, the overall height of the mounting area is more than twice that of the area for mounting only the cable drum for the power window lift. Similarly, the cable drum for the power window lift is only mounted in the area with the greater diameter, while the cable drum for the manual window lift extends through the first area into the second area. This corresponds to the different heights of the cable drums for the power and manual window lifts.

According to a further preferable embodiment of the invention, the drum housing is manufactured as a part of a so-called hybrid door. Thus, the drum housing is introduced into the door by way of injection molding or stamping. Hybrid doors and their manufacture are known in the prior art (see https://plastics.bayer.de/AG/DE/technology/1013/59/index.jsp, and http://dbindustrie.svhfi.securitas.net/AI/resources/2b53f848ad7.pdf). The production of a compound body consisting of synthetic or metal parts with a form closure formed by injection molding or extrusion between both components makes it possible to construct highly resilient, as well as cost-effective components.

According to a further preferred embodiment of the invention, the drum housing involves a separate component that may be secured, e.g., to the electric motor of the window lift drive or an inside door panel.

BRIEF DESCRIPTION OF THE DRAWING

A preferred embodiment is described below in more detail in reference to the drawings, which show the following.

DETAILED DESCRIPTION OF THE INVENTION

Figure 1:
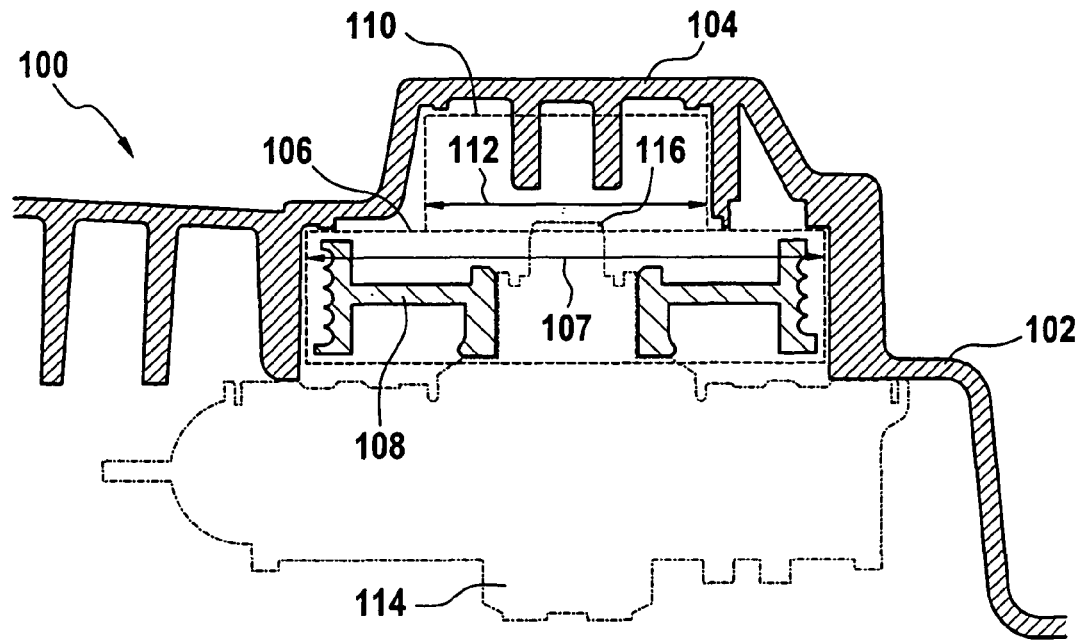
FIG. 1: A sectional view taken through line 1/2-1/2 of FIG. 4, showing an embodiment of a door module with a power window lift drive instead of a manual window lift drive.

FIG. 1 shows a partial sectional view of a door module 100 in the area of the window lift drive. The door module 100 has a carrier part 102 for mounting the door units and door fittings, especially the window lift drive. For this purpose, the carrier part 100 has a mounting area for a cable drum for the window lift drive, whereby this mounting area is formed by a drum housing 104 integrated into the carrier part 102, which drum housing forms a structural unit with the carrier part 102. For example, with regard to the carrier part 102 containing the drum housing 104, we are concerned with a single synthetic injection casting.

The mounting area for the cable drum for the window lift drive enclosed by the drum housing has an area 106 depicted by the dashed line in FIG. 1. Area 106 has a diameter 107 selected such that it is sufficient for mounting a cable drum 108 for a power window lift drive. The diameter of the area 106 is, for example, about 35 to 65 mm, preferably about 40 to 60 mm.

Area 110 of the mounting area, which is also depicted by a dashed line in FIG. 1, is adjacent to area 106. Area 110 has a diameter 112 that is less than diameter 107 of area 106. Diameter 112 is selected sufficiently large for mounting a cable drum for a manual window lift drive.

In the application shown here, the door module 100 is used for a vehicle with a power window lift. Accordingly, only area 106 for mounting the cable drum 108 of the power window lift is used. The cable drum 108 is driven by an electric motor 114 attached to the carrier part 102.

When a user actuates the electric motor 114, e.g., by pressing a push-button switch, the cable drum 108 rotates around the axis 116 in order to wind or unwind the drive cable for adjusting the window on the cable drum 108, depending on whether window opening or closing is desired.

Figure 2:
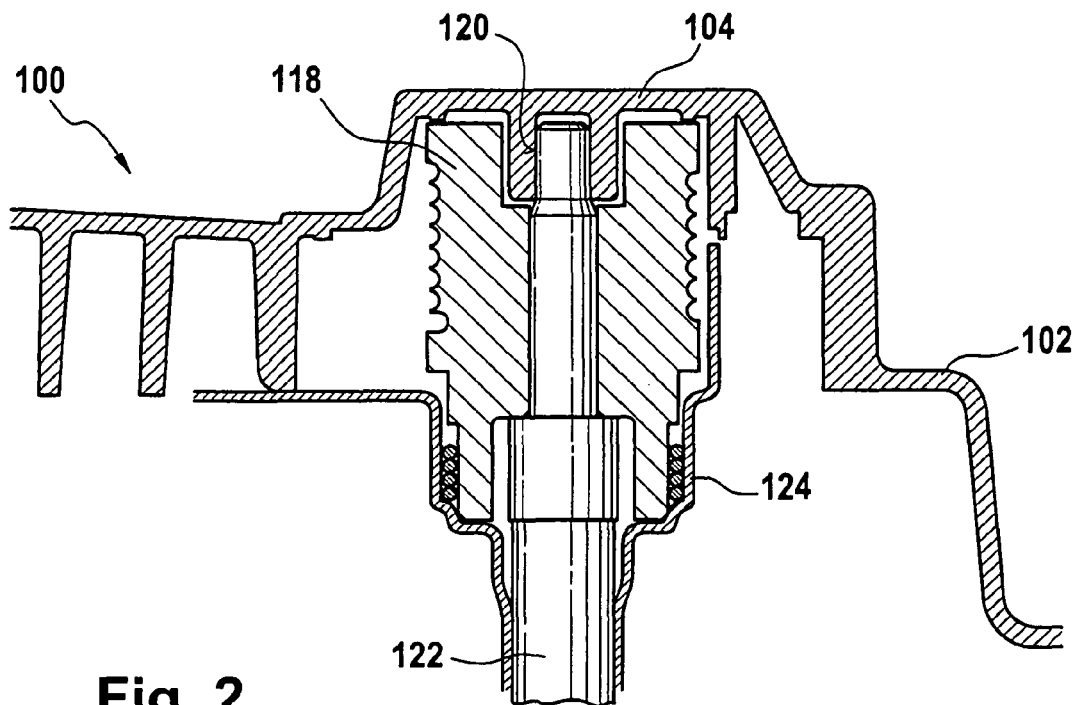
FIG. 2: The door module of FIG. 1 with a manual window lift drive instead of the power window lift drive.

FIG. 2 shows the door module 100 to be used in a vehicle with manual window lift drive. In this case, a cable drum 118 is situated in the mounting area exhibiting a smaller diameter than the cable drum. In addition, cable drum 118 has a considerably greater overall height than does cable drum 108, in order to unwind the same cable length for opening or closing the window in spite of its smaller diameter. Cable drum 118 thus substantially fills out the area 110 with the smaller diameter and extends through the area 106 with the greater diameter 107. A slide bearing 120 is designed in the drum housing 104 for mounting the axle 122 of the manual window lift drive. Moreover, the brake housing 124 is attached to the carrier part 102.

Due to the design of the mounting area incorporating two areas 106, 110, it is possible to use the same door module 100 for vehicles with both manual and power window lift.

Also, the carrier part 102 preferably provides the function of dividing the door interior in a dry and a wet area, whereby the dry area is limited by door lining visible from the vehicle interior.

Figure 3:
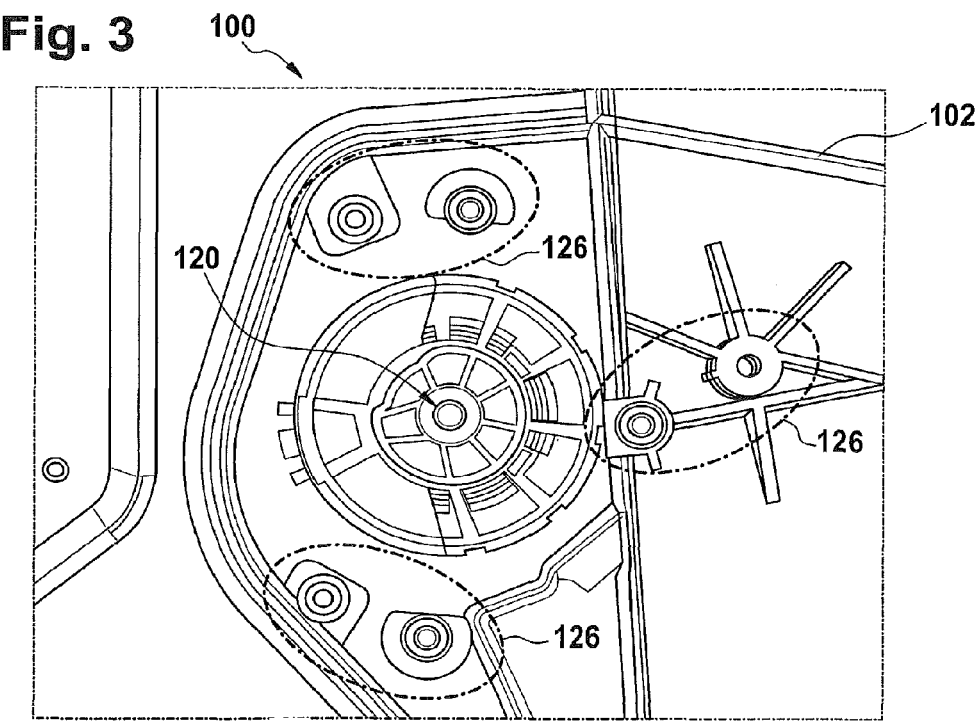
FIG. 3: A top view of the dry area side of the door module.

FIG. 3 shows a similar top view of the carrier part 102 from the side of the dry area, i.e., the interior of the vehicle. Fastening elements 126 are placed on the carrier part 102, and serve to fasten the electric motor 114 or the brake housing 124. For this reason, the door module 100 may be used for vehicles with either manual or power window lift, if the electric motor 114 (see FIG. 1) or the brake housing 124 (see FIG. 2) are fastened at different points.

Figure 4:
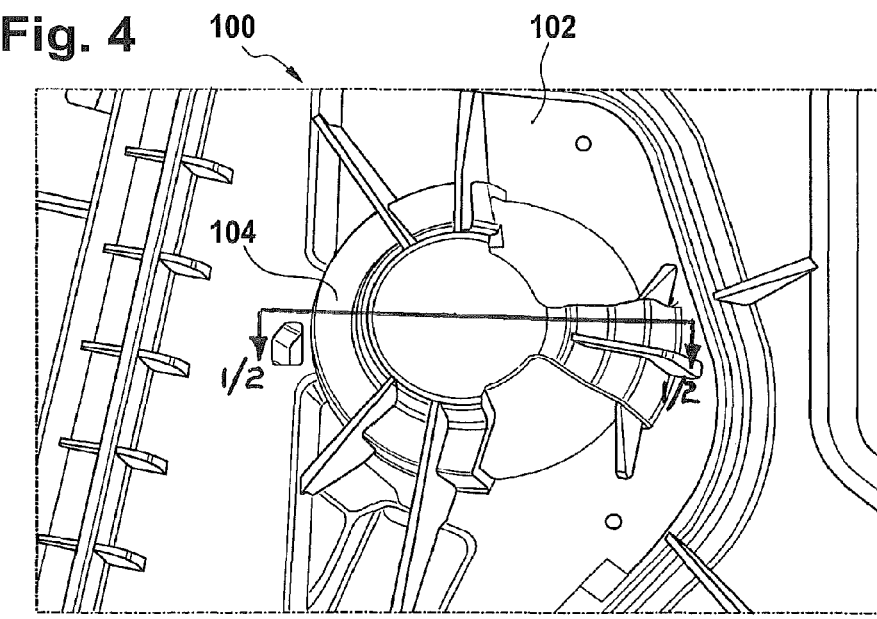
FIG. 4: A top view of the side of the wet area of the door module.

FIG. 4 shows the door module 100 in a top view from the side of the dry area. It is especially advantageous that the drum housing 104 forms a structural unit with the carrier part 102, so that in the area of the drum housing 104, no humidity from the wet area may transfer to the dry area. This, moreover, has the advantage that a separate installation step for installing the drum housing on the carrier part may be omitted. Also, the placement of a seal between the drum housing and the carrier part becomes unnecessary.

REFERENCE LIST

100 Door module
102 Carrier part
104 Drum Housing
106 Area
107 Diameter
108 Cable drum
110 Area
112 Diameter
114 Electric motor
116 Axle
118 Cable drum
120 Slide bearing
122 Axle
124 Brake housing
126 Fastening element

The invention claimed is:
1. A drum housing for a window lift portion of a motor vehicle, comprising:
a mounting area for mounting at least one of a power window lift drive cable drum, and a manual window lift drive cable drum, the mounting area including side walls and a back wall formed integrally as a single piece, all defining an internal volume;

a first area within the internal volume of the mounting area, the first area having a first diameter that is sufficient for mounting the power window lift drive cable drum;

a second area within the internal volume of the mounting area having a second diameter that is sufficient for mounting the manual window lift drive cable drum, and that is less than the first diameter; and a thrust bearing integrally formed on the back wall of the mounting area, in axial alignment with the first and second diameters of the first and second areas, and for receiving a mounting axle of the manual window lift drive, wherein:

the power window lift drive cable drum is disposed within the first area when the manual window lift drive cable drum is not disposed within the second area, and the manual window lift drive cable drum is disposed within the second area when the power window lift drive cable drum is not disposed within the first area.

2. A drum housing according to claim 1, whereby the first area seen from the vehicle interior is arranged before the second area.

3. A drum housing according to claim 1, further comprising a fastening element for a motor of the power window lift drive and for a brake housing of the manual window lift drive.

4. A drum housing according to claim 1, whereby the thrust bearing is a slide bearing.

5. A drum housing according to claim 1, wherein at least one of:
the first diameter is about 35 to 65 mm; and
the second diameter is about 20 to 40 mm.

6. A drum housing according to claim 1, wherein: the first area exhibits a first axial height matching a height of the cable drum for the power window lift drive, the second area exhibits a second axial height greater than the first axial height, and the sum of the first and second axial heights substantially matches a height of the cable drum for the manual window lift drive.

7. A door module for a motor vehicle, comprising:
a carrier part;
a drum housing mounting area formed integrally with the carrier part, and for mounting at least one of a power window lift drive cable drum, and a manual window lift drive cable drum, the drum housing mounting area including side walls and a back wall formed integrally as a single piece, all defining an internal volume;
a first area within the internal volume of the drum housing mounting area having a first diameter that is sufficient for mounting the power window lift drive cable drum;
a second area within the internal volume of the drum housing mounting area having a second diameter that is sufficient for mounting the manual window lift drive cable drum, and that is less than the first diameter; and
a thrust bearing integrally formed on the back wall of the drum housing mounting area, in axial alignment with the first and second diameters of the first and second areas, and for receiving a mounting axle of the manual window lift drive, wherein
the power window lift drive cable drum is disposed within the first area when the manual window lift drive cable drum is not disposed within the second area, and
the manual window lift drive cable drum is disposed within the second area when the power window lift drive cable drum is not disposed within the first area.

8. A door module according to claim 7, whereby the mounting area is limited by a drum housing that forms a structural unit with the carrier part.

9. A door module according to claim 7, further comprising fastening elements for at least one of: (i) a motor for the power window lift drive and (ii) a brake housing of the manual window lift drive.

10. A door module according to claim 7, whereby the carrier part is designed for subdividing a door interior into a wet area and a dry area, and whereby the second area of the mounting area is arranged such that it faces the wet area.

11. A door module according to claim 10, whereby the drum housing mounting area, which forms a structural unit with the carrier part, serves to separate the wet area and the dry area.

12. A door module according to claim 7, wherein at least one of:
the first diameter is about 35 to 65 mm; and
the second diameter is about 20 to 40 mm.

13. A door module according to claim 7, wherein:
the first area exhibits a first axial height matching the height of the cable drum for the electric window lift drive;
the second area exhibits a second axial height greater than the first axial height, a sum of the first axial height and second axial height matching the height of the cable drum for the manual window lift drive; and
the sum of the first and second axial heights is more than double that of the first axial height.

14. A hybrid door of a motor vehicle, comprising:
a door module;
a drum housing formed integrally with the door module and having a mounting area for mounting at least one of a power window lift drive cable drum, and a manual window lift drive cable drum, the mounting area including side walls and a back wall formed integrally as a single piece, all defining an internal volume;
a first area within the internal volume of the drum housing having a first diameter that is sufficient for mounting the power window lift drive cable drum; and
a second area within the internal volume of the drum housing having a second diameter that is sufficient for mounting the manual window lift drive cable drum, and that is less than the first diameter; and
a thrust bearing integrally formed on the back wall of the mounting area, in axial alignment with the first and second diameters of the first and second areas, and for receiving a mounting axle of the manual window lift drive, wherein
the power window lift drive cable drum is disposed within the first area when the manual window lift drive cable drum is not disposed within the second area, and
the manual window lift drive cable drum is disposed within the second area when the power window lift drive cable drum is not disposed within the first area.

15. A hybrid door according to claim 14, wherein:
the first area exhibits a first axial height matching a height of the cable drum for the power window lift drive; and
the second area exhibits a second axial height greater than the first axial height, a sum of the first axial height and the second axial height matching a height of the cable drum for the manual window lift drive.

* * * * *